United States Patent [19]
McBurney

[11] Patent Number: 6,012,013
[45] Date of Patent: Jan. 4, 2000

[54] VEHICLE POSITION REPORTING IN USER DEFINED UNI-DIMENSIONAL COORDINATE SYSTEM

[75] Inventor: Paul McBurney, San Francisco, Calif.

[73] Assignee: Trimble Navigation Limited, Sunnyvale, Calif.

[21] Appl. No.: 08/850,616

[22] Filed: May 2, 1997

Related U.S. Application Data

[63] Continuation of application No. 08/414,784, Mar. 31, 1995, abandoned.

[51] Int. Cl.[7] .................................................. G06F 15/00
[52] U.S. Cl. ......................... 701/207; 701/208; 701/214; 340/988; 342/357.01; 342/357.08; 342/357.09
[58] Field of Search .................................. 701/207, 208, 701/212, 3, 214–6, 220; 342/357.01, 357.02, 357.06, 357.08, 357.09, 357.1; 340/988, 9, 991, 3

[56] References Cited

U.S. PATENT DOCUMENTS

| | | | |
|---|---|---|---|
| 5,357,437 | 10/1994 | Polvani | 364/449 |
| 5,678,194 | 10/1997 | Grube et al. | 701/207 |

*Primary Examiner*—William A. Cuchlinski, Jr.
*Assistant Examiner*—Yonel Beaulieu
*Attorney, Agent, or Firm*—Boris G. Tankhilevich

[57] ABSTRACT

The method and the apparatus for the outputting in a uni-dimensional coordinate system the position coordinates and speed determined by the position and speed determining system (PSDS) are disclosed. The PSDS can include the SATPS receiver, the inertial positioning system, or the combination of both. The digital database of the geographic area is introduced by the user in the arbitrary coordinate system and is translated into the preferred coordinate system in order to define the uni-dimensional coordinate system. The large geographic area (LGA) and the small geographic area (SGA) embodiments are disclosed.

18 Claims, 5 Drawing Sheets

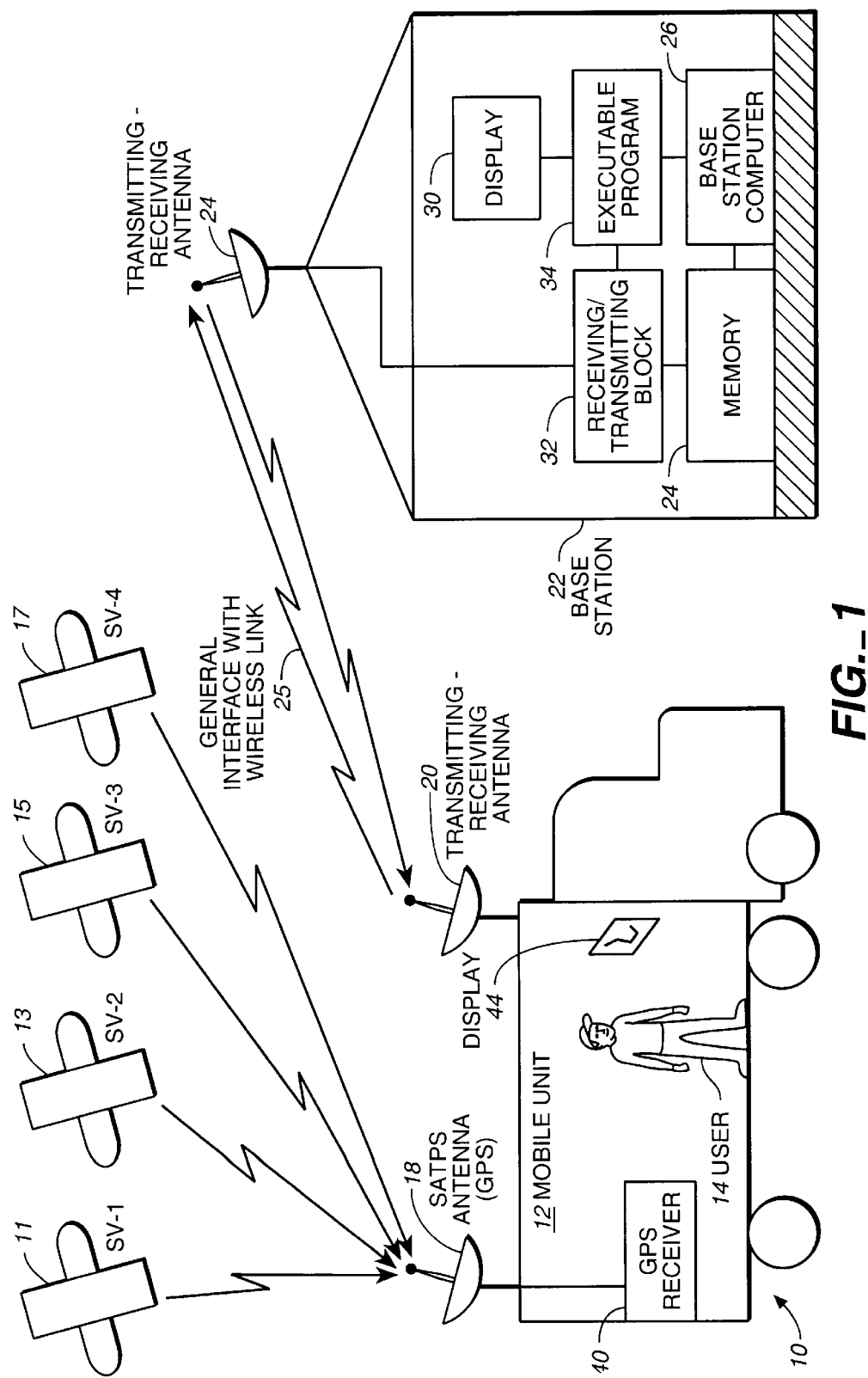
FIG._1

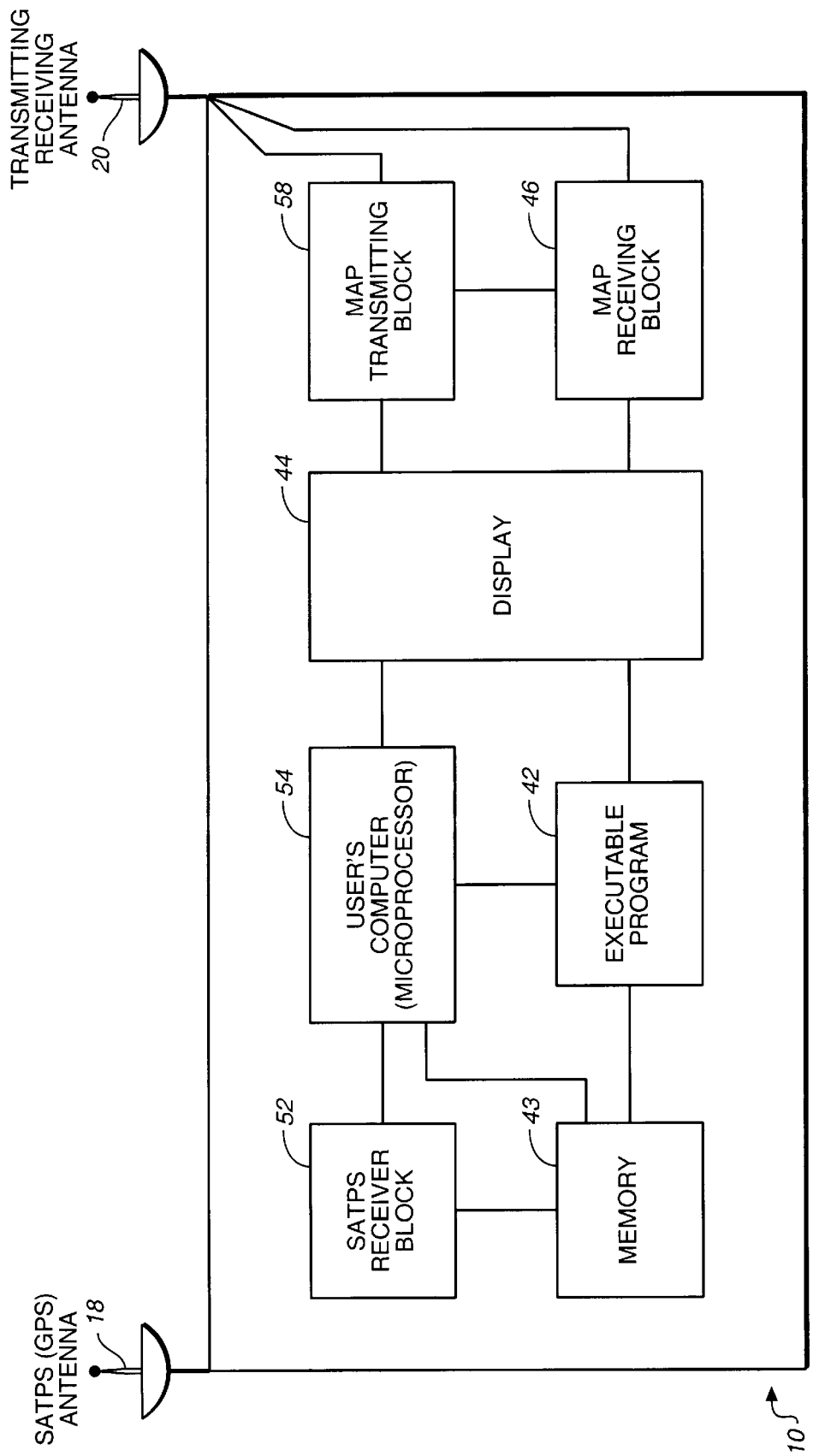
FIG._2

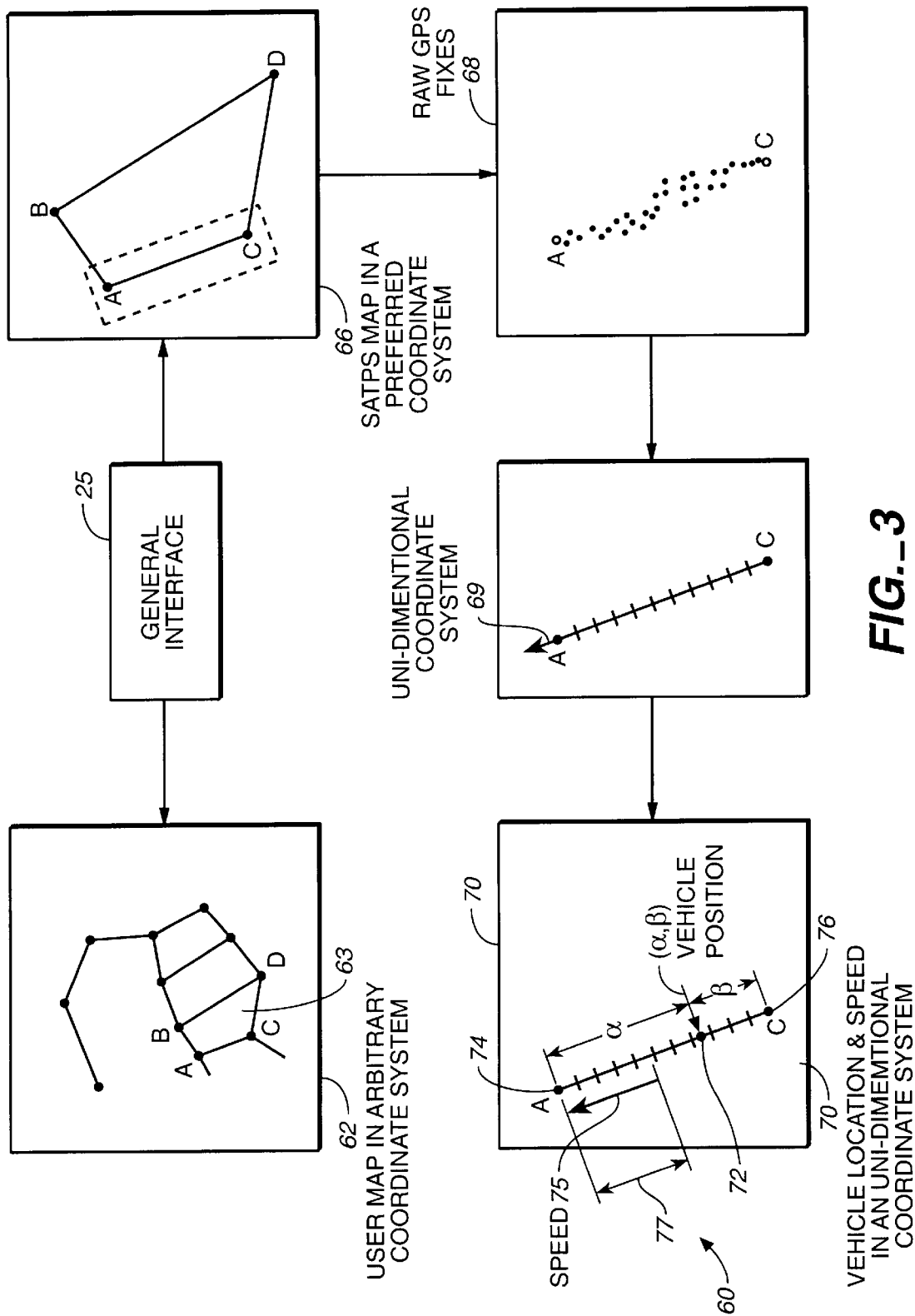
FIG._3

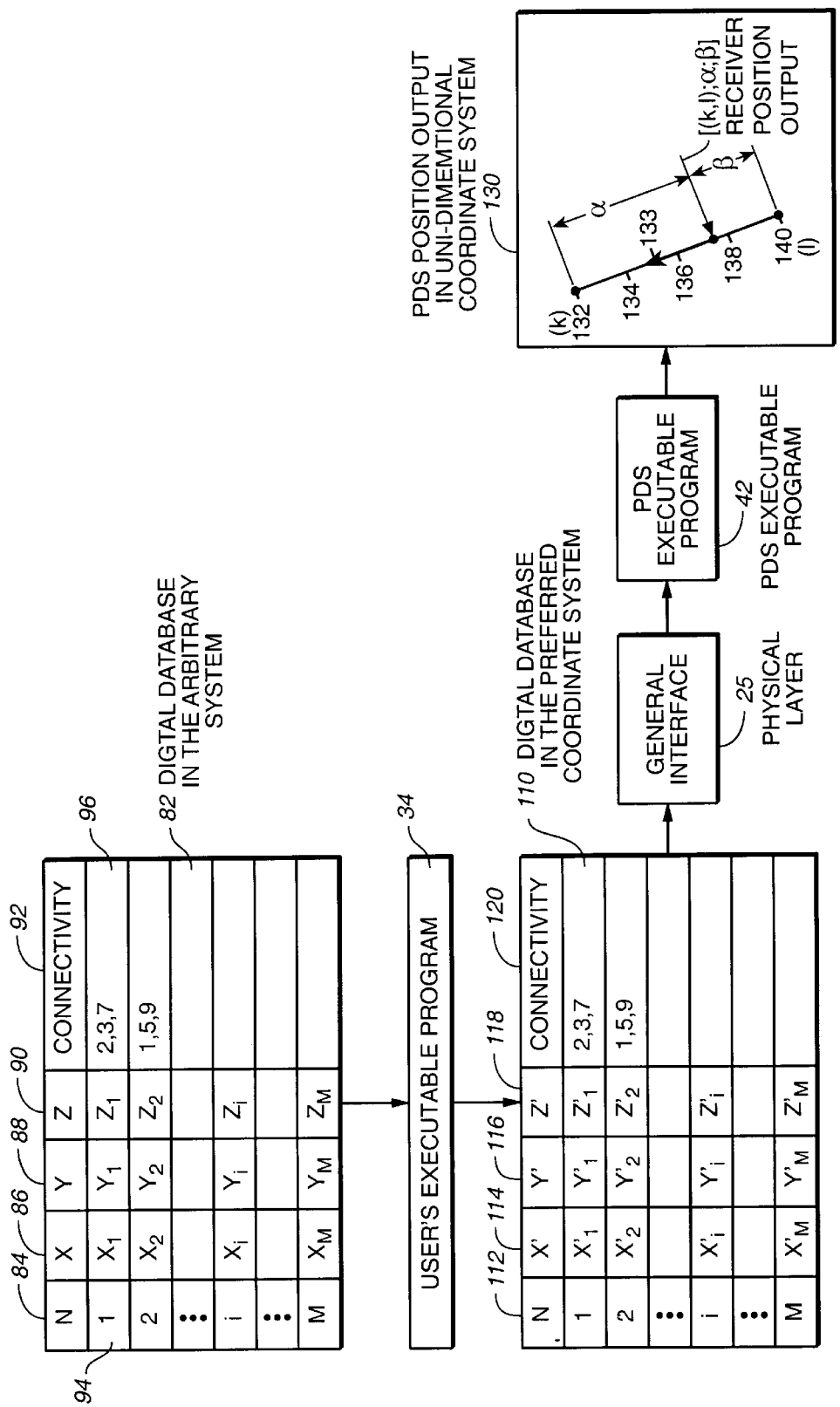
FIG._4

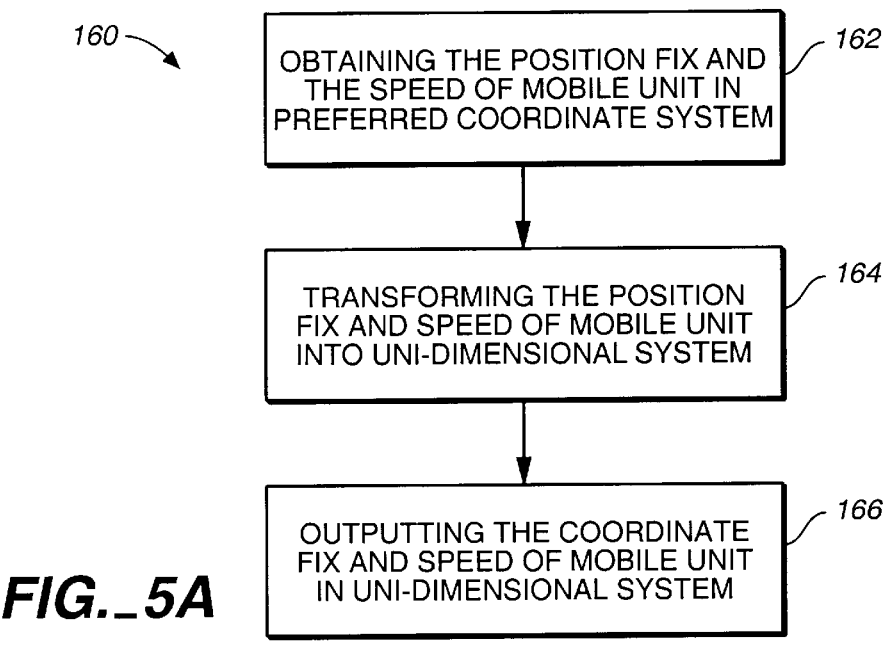
FIG._5A
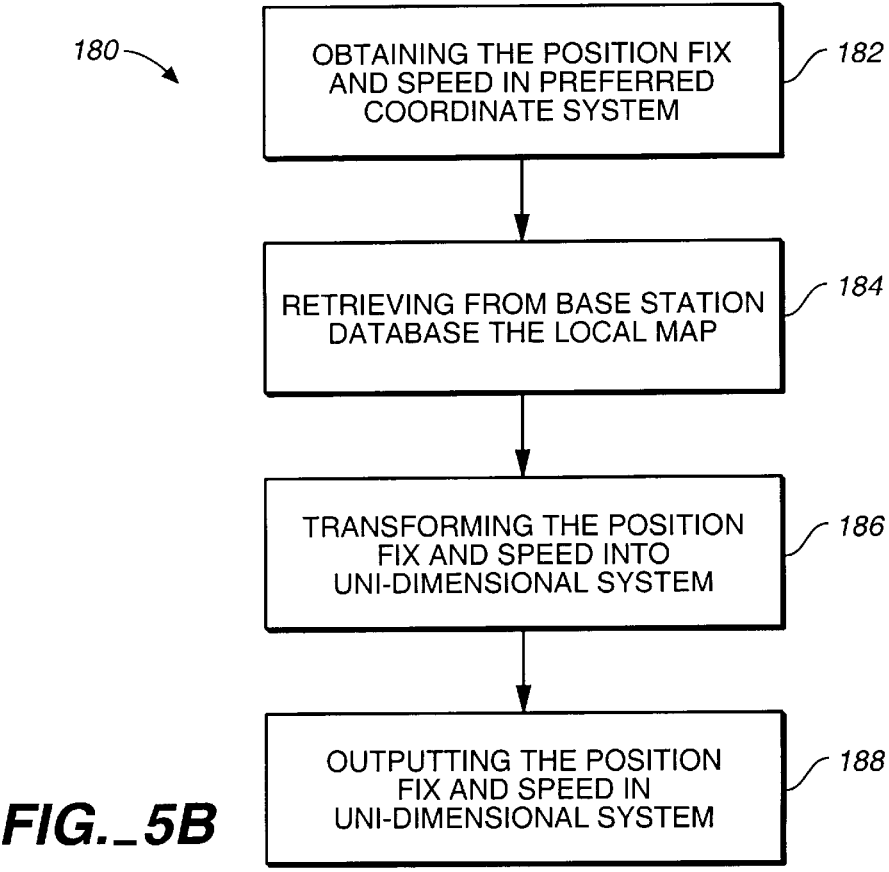
FIG._5B

VEHICLE POSITION REPORTING IN USER DEFINED UNI-DIMENSIONAL COORDINATE SYSTEM

This is a continuation of the U.S. patent application Ser. No. 08/414,784 filed on Mar. 31, 1995, now abandoned.

BACKGROUND

In vehicle navigation systems, a vehicle's position is determined through the accumulation of data gathered by various sensors. Typical navigation sensors include compasses to measure the absolute vehicle heading relative to the earth's magnetic field, gyroscopes and differential odometers to measure the vehicle's relative heading; and odometers to measure the absolute distance traveled by the vehicle. Errors in vehicle position result from the accumulation of measurement errors by each of the sensors.

A technique known as "map matching" has been used to correct vehicle position errors which result from the accumulation of navigation sensors' errors. Map matching uses geometrical similarities in its decision-making process. The navigation system compares the current vehicle trajectory to street geometries near the currently stored vehicle position. The system then corrects the vehicle position to the location which most closely matches the vehicle's trajectory. To accomplish this, the map matching system searches its internal map data base in the vicinity of the most recently calculated vehicle position to find street candidates which lie in the direction in which the vehicle is currently headed. The vehicle's heading, speed, and distance traveled are continuously monitored and compared to the geometry of the current "list" of street candidates. As the geometry of each street diverges from the vehicle's calculated trajectory, that street is eliminated as a possible location. This process continues until all streets are eliminated except one. That street is then stored as the current location of the vehicle.

Kao in U.S. Pat. No. 5,374,933, discloses a position correction method for a vehicle navigation system with improved accuracy over simple map matching techniques. In the preferred embodiment, the system first stores a known vehicle position in its memory. As the vehicle moves away from the known position, the system uses a variety of means to sense external signals. These means include satellite transmission receivers and magnetic compasses. When a change in the external signals occurs because of a nearby landmark, the system uses the location of the landmark to set the vehicle's position. To accomplish this, the system's data processor searches a map data base, attempting to fix the position of the sensed landmark with respect to the initial stored known position. When the system identifies the most likely landmark, the position of the vehicle is then reset to that position. This technique can be thought of as "phenomenon matching."

U.S. Pat. No. 5,345,388 issued to Kashiwazaki discloses a navigation system adapted to efficiently utilize a memory for storing locus data, thus making it possible to store more loci by lesser quantity of data, and to reference to a longer movement path by the same memory capacity. The invention also provides a navigation system adapted to preserve or store, as locus data, movement paths which were run in the past so that they can be readily referenced to when one goes to the same destination for a second time, thus permitting support of driving to be effective. Storing of locus data is carried out by detecting a traveling azimuth to judge a change in the travelling azimuth to compress locus data only to data in a predetermined range before and after the position where the azimuth is changed.

There are several well known in the art navigation systems incorporating satellite positioning system (SATPS) for navigating various mobile objects such as automobiles, airplanes, ships, or the like in a global geometrical region. Typically, such a navigation system on a mobile object has a SATPS receiver which receives radio waves transmitted from three or more SATPS satellites, determines the position of a reception point where its radio-wave receiver has received the radio waves, based on quasi-distance data between the SATPS satellites and the reception point, including a time offset of the receiver, and positional data of the SATPS satellites, and outputs the data about the determined position. Since, however, the radio waves from the SATPS satellites may not necessarily be received under good conditions because of receiving environments and weather conditions, some navigation systems which incorporate a SATPS receiver are also combined with a self-operating sensor which produces the positional data of its own. In operation, the navigation system selects whichever of the data from the SATPS receiver and the self-operating sensor is more accurate at the time for higher positioning accuracy for better navigation. The self-operating sensor for use in automobile navigation systems may comprise an orientation sensor such as a geomagnetic sensor or a gas-rate gyroscope, or a speed sensor such as a sensor for detecting the rotational speed of a crankshaft. The navigation system may employ a PDOP (Position Dilution Of Precision) value for determining the accuracy with which the SATPS receiver determines the position. If the PDOP value is equal to or lower than a predetermined value, then the navigation system selects the data from the SATPS receiver for navigation. The PDOP value is used in a three-dimensional positioning system in which the three-dimensional position of a reception point is determined by simultaneously measuring the distances up to four or more SATPS satellites. The PDOP value is representative of how positional errors of the SATPS satellites are reflected by the calculated present position of the reception point. If the PDOP value is larger, then it indicates that the calculated present position of the reception point is suffering a greater error. When only a two-dimensional positioning process is available, the PDOP value cannot be obtained and the navigation system cannot detect a reduction in the positional accuracy owing to an error caused by a change in the altitude of the reception point. In the event of an intentional accuracy reduction known as selective availability (SA), the effective position accuracy (related to the PDOP value) is known to be larger than the basic SATPS accuracy, which results in a lower degree of positional accuracy. Thus, the navigation system can automatically select the data from the self-operating sensor even when the positional accuracy of the data from the self-operating sensor is actually lower than the positional accuracy of the data from the SATPS receiver.

Fukushima in U.S. Pat. No. 5,293,318, discloses a navigation system including a global positioning system (GPS) receiver and a self-operating sensor for determining the position of a reception point or a mobile object such as an automobile in a global geometrical region with the increased accuracy when the PDOP value cannot be determined with an adequate degree of precision. This goal is achieved by providing a navigation system with a first positional data produced by the GPS receiver and a second positional data produced by a self-operating sensor. A data processor compares previous and present first positional data to determine whether the difference therebetween is equal to or smaller than a first predetermined value, and also determines whether a PDOP value of the present first positional data is equal to or smaller than a second predetermined value. The present first positional data and the second positional data are compared to determine whether the difference between the present position of the automobile as indicated by the present first positional data and the present position of the automobile as indicated by the second present positional data is equal to or greater than a third predetermined value. The data processor outputs the first positional data as present positional data if the difference between the previous and present first positional data is equal to or smaller than the first predetermined value, if the PDOP value is equal to or smaller than the second predetermined value, and also if the difference between the present position of the automobile as indicated by the present first positional data and the present position of the automobile as indicated by the second present positional data is equal to or greater than the third predetermined value.

Kato in U.S. Pat. No. 5,272,483, discloses another navigation system which is also intended to overcome the problems of the inadequate determination of the PDOP when a positioning mode switches between two- and three-dimensional positioning modes. The navigation system includes a GPS receiver and a self-operating sensor for navigating a reception point or a mobile object such as an automobile accurately at all times in a global geometrical region and displaying the position of the mobile object accurately on a display unit based on effective use of GPS data from the GPS receiver.

A relative positioning system (RPS), such as a dead reckoning system with map matching, is disclosed in U.S. Pat. No. 4,796,191 issued to Honey et al. The RPS is different from an absolute positioning system (APS) like a Global Positioning System (GPS) because the RPS can operate in a fully self-contained way, requiring no equipment outside the vehicle in which it is used. It typically has high accuracy over significant intervals of time. It is linked to an electronic map of roads which can automatically eliminate minor vehicle position errors and measurement noise and provide a graphical user display. For example, as a vehicle using such a system moves on board wheel sensors, a magnetic compass and/or other sensing means computes the vehicle's position using dead reckoning techniques. The computed position is compared frequently with an electronically stored map of roads. If the computed position does not correspond to a location on the nearest appropriate road, the system automatically corrects the vehicle's position to place it on that nearest road. However, the dead-reckoning system has a number of disadvantages. One of the disadvantages is that sometimes navigation performance can degrade if the map matching relocates the vehicle's position to an incorrect road. This can occur because of an extreme anomalous magnetic field, wheel slippage or map errors. Another disadvantage arises if the difference between the computed vehicle position and the nearest appropriate road is too large, i.e. exceeds a predetermined allowable error estimate. Under these circumstances the dead reckoning system will not update its position.

Mathis et al. in U.S. Pat. No. 5,311,195, discloses a combined relative and absolute positioning method and apparatus which overcomes the disadvantages of the pure RPS. The absolute positioning system (APS) can include a Loran-C or a GPS. The information provided by the APS is used for updating RPS position, so that when the RPS is reset or updated, it is updated to the current APS position with its offset.

In U.S. Pat. No. 5,283,575 issued to Kao and Huang, a vehicle navigation system employing a fuzzy logic is disclosed. The sensors continually feed position coordinates to a processing unit that traces the vehicle's path in a road database. The errors of positioning sensors and routing computers are overcome by using the fuzzy logic. Fuzzy logic-based reasoning is used to determine the most probable location of the vehicle, whether off- or on-road, thereby correcting errors in its raw path as sensed or computed.

Thus, according to the prior art, for a customer to display his position on a particular road on some map, he has to translate the "raw" fixer obtained by using some positioning system to the position on the particular road. All companies who provide the position determining means do this step of translating the raw "fixer" to the position on the particular road after the raw fixer is obtained. Different companies use different maps, data timers, displays, etc.

What is needed is to add value to the SATPS receiver, so that the SATPS receiver would have the built-in map-matching capability by translating inside the receiver the raw fixer into the position on a particular road, wherein the receiver's position could be defined in terms of a uni-dimensional coordinate system.

SUMMARY

The present invention is unique because it discloses a method and apparatus for outputting the coordinate fix and speed of the mobile unit in an uni-dimensional coordinate system.

One aspect of the present invention is directed to a method for outputting coordinate fix and speed of a mobile unit along a path in a Small Geographic Area (SGA) in a uni-dimensional coordinate system. The method comprises the following steps: (1) obtaining the coordinate fix and the speed of the mobile unit in a preferred coordinate system using a position and speed determining system (PSDS); (2) transforming the coordinate fix and speed of the mobile unit from the preferred coordinate system into the uni-dimensional coordinate system using a user's computer; and (3) outputting the coordinate fix and the speed of the mobile unit in the uni-dimensional coordinate system.

In one embodiment, the step of transforming the coordinate fix and speed of the mobile unit from the preferred coordinate system into the uni-dimensional coordinate system further comprises the steps of: (a) retrieving a digital database of the SGA from a memory of the user's computer, wherein the SGA comprises a plurality (m) of points in an arbitrary coordinate system, m being an integer; (b) defining the original connectivity of the plurality of (m) points of the SGA in the arbitrary coordinate system, wherein the connectivity of each two points passable by the mobile unit is different from the connectivity of each two points not passable by the mobile unit; (c) translating points inside the digital database from the arbitrary coordinate system into the preferred coordinate system by an executable program loaded into the user's computer; and (d) defining the uni-dimensional coordinate system in the preferred coordinate system by using an executable program of the user's computer.

In one embodiment, the step of defining the original connectivity of the digital database further comprises the step of defining the connectivity in such a way that each two points have connectivity of value one if they can be connected, and each two points have connectivity of value zero if they can not be connected.

The step of defining the uni-dimensional coordinate system in the preferred coordinate system further includes the following substeps: (1) enumerating each the point of digital database of the SGA, wherein the enumerating process generates a plurality of numbers (1, 2, . . . , i, . . . m), and wherein each (i) point from the digital database has the three-dimensional coordinate ($x_i$ $y_i$ $z_i$) in the preferred coordinate system; (2) connecting each two points (k, l) from the digital database having connectivity of value one in the preferred coordinate system, k and l being integers; and (3) generating at least one uni-dimensional coordinate system, wherein each line created by connecting two points having connectivity of value one in the preferred coordinate system comprises a uni-dimensional coordinate system.

The step of outputting the position location coordinates and speed of the mobile unit in the selected uni-dimensional coordinate system further includes the steps of: (1) obtaining a signal component ($x_0 y_0 z_0$) of the position fix of the mobile unit, wherein the position fix includes the signal component and a noise component; (2) outputting the signal component ($x_0 y_0 z_0$) of the position location along some line (s, t), wherein the line (s, t) connects points (s) and (t) in the SGA digital database having connectivity of value one, and wherein the line (s, t) represents a unique uni-dimensional coordinate system which includes the signal component ($x_0 y_0 z_0$) of the position fix determined by the PSDS; and (3) determining the distance $\alpha$ between the signal component of the position fix ($x_0 y_0$ $z_0$) and point (s) along the line (s,t), and determining the distance $\beta$ between the signal component of the position fix ($x_0 y_0 z_0$) and point (t) along the line (s,t), wherein the pair ($\alpha,\beta$) comprises a uni-dimensional coordinate of the signal component of the position fix of the mobile unit in the uni-dimensional coordinate system (s,t).

In the preferred embodiment, the method of the present invention further includes the steps of: (1) obtaining the speed of the mobile unit having the coordinate fix signal component ($x_0 y_0 z_0$); and (2) outputting the speed of the mobile unit corresponding to the position location ($x_0 y_0 z_0$) along the line (s, t) in the direction towards the point (s) or in the direction towards point (t).

In one embodiment, the PSDS can include a satellite positioning system (SATPS) receiver.

In another embodiment, the PSDS can include an inertial position determining system (IPDS).

In the preferred embodiment, the preferred coordinate system comprises a Latitude, Longitude, and Altitude (LLA) coordinate system with respect to the world geographic survey system 1984 (WGS84).

Another aspect of the present invention is directed to a method of determining location and speed of a mobile unit along a path in a Large Geographic Area (LGA) in a uni-dimensional coordinate system. In this embodiment, the method comprises the steps of: (1) obtaining the coordinate fix and the speed of the mobile unit in a preferred coordinate system using a position and speed determining system (PSDS); (2) retrieving from a base station computer storing the LGA map information the local map information corresponding to the position fix of the mobile unit; (3) transforming the coordinate fix and speed of the mobile unit from the preferred coordinate system into the uni-dimensional coordinate system using a user's computer; and (4) outputting the coordinate fix and the speed of the mobile unit in the uni-dimensional coordinate system.

Yet one more embodiment of the present invention is directed to an apparatus for outputting position fix and speed of a mobile unit along a path in a uni-dimensional coordinate system. The apparatus comprises: (1) a source of a coordinate fix and speed of the mobile unit in a preferred coordinate system; (2) a stored database of a map information in an arbitrary coordinate system; and (3) a user computer responsive to the map information stored in the arbitrary coordinate system in the database, wherein the computer is configured to define the uni-dimensional coordinate system and to transform the coordinate fix and speed of the mobile unit from the preferred coordinate system into a location and speed along a path in the uni-dimensional coordinate system.

In one embodiment, the apparatus further comprises: a base station computer; and a general interface between the user computer and the base station computer.

In the preferred embodiment, the general interface includes a protocol layer and a physical layer. The protocol layer of the general interface introduces the identity of the preferred coordinate system to the base station computer. An executable program loaded into the base station computer translates points inside the digital database from the arbitrary coordinate system into the preferred coordinate system. The physical layer of the general interface physically transfers the digital database from the base station computer back to the user computer, wherein an executable program of the user computer using the transferred digital database and the position fix selects a uni-dimensional coordinate system in the preferred coordinate system. Finally, the user computer outputs the coordinate fix and the speed of the mobile unit in the selected uni-dimensional coordinate system.

BRIEF DESCRIPTION OF THE DRAWINGS

FIG. 1 illustrates a GPS receiver that outputs its position location and speed in a uni-dimensional coordinate system.

FIG. 2 depicts a diagram that describes an architecture of a GPS receiver with a universal map position output.

FIG. 3 shows a diagram outlining the process of outputting the GPS receiver position and speed in a uni-dimensional coordinate system.

FIG. 4 is an illustration of the translation of the digital database from the arbitrary user defined coordinate system into the preferred coordinate system and the determination of the mobile unit position and speed in the uni-dimensional coordinate system.

FIG. 5A depicts a flow chart showing the steps of the process of outputting GPS position fix and speed in the uni-dimensional coordinate system in the SGA embodiment.

FIG. 5B shows a flow chart of the process of outputting the mobile unit position fix and speed in the uni-dimensional coordinate system in the LGA embodiment.

FULL DESCRIPTION OF THE PREFERRED EMBODIMENTS

FIG. 1 illustrates the apparatus of the present invention used for outputting the position location and speed of the satellite positioning system (SATPS) receiver 40 in a uni-dimensional coordinate system, referred to herein by the general reference numeral 10.

The present invention can be used for any position determining system (PSDS), including a SATPS receiver, or an inertial position determining system including a self-operating sensor that produces positional data, or any combination of a SATPS receiver and an inertial position determining system.

In one embodiment, the PSDS includes a GPS receiver including a GPS antenna 18 capable of receiving the satellite signals from at least four satellite-vehicles SV1 (11), SV2 (13), SV3 (15), and SV4 (17).

In the preferred embodiment, these four satellites are part of the GPS.

The GPS is a system of satellite signal transmitters, with receivers located on the earth's surface or adjacent to the earth's surface, that transmits information from which an observer's present location and/or the time of observation can be determined. There is also the Global Orbiting Navigational System (GLONASS), which can operate as an alternative GPS system.

The GPS is part of a satellite-based navigation system developed by the United States Defense Department under its NAVSTAR satellite program. A fully operational GPS includes up to 24 Earth satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the earth below. Theoretically, three or more GPS satellites will be visible from most points on the earth's surface, and visual access to three or more such satellites can be used to determine an observer's position anywhere on the earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiplies f1=1540 f0) and f2=1200 f0 of a base frequency f0=1.023 MHz. The L1 signal from each satellite is binary phase shift key (BPSK) modulated by two pseudorandom noise (PRN) codes in phase quadrature, designated as the C/A-code and P(Y)-code. The L2 signal from each satellite is BPSK modulated by only the P(Y)-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $\sim f^2$). This phenomenon is discussed by MacDoran in U.S. Pat. No. 4,463,357, which discussion is incorporated by reference herein. When transit time delay through the ionosphere is determined, a phase delay associated with a given carrier signal can also be determined.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P(Y)-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P(Y)-code and is a relatively short, coarser-grained code having a clock or chip rate of f0=1.023 MHz. The C/A-code for any GPS satellite has a length of 1023 chips or time increments before this code repeats. The full P(Y)-code has a length of 259 days, with each satellite transmitting a unique portion of the full P(Y)-code. The portion of P(Y)-code used for a given GPS satellite has a length of precisely one week (7.000 days) before this code portion repeats. Accepted methods for generating the C/A-code and P(Y)-code are set forth in the document GPS Interface Control Document ICD-GPS-200, published by Rockwell International Corporation, Satellite Systems Division, Revision B-PR, Jul. 3, 1991, which is incorporated by reference herein.

The GPS satellite bit stream includes navigational information on the ephemeris of the transmitting GPS satellite (which includes complete information about the transmitting satellite within the next several hours of transmission) and an almanac for all GPS satellites (which includes less detailed information about all other satellites). The transmission by the transmitting GPS satellite information has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus, complete 17 and 16 revolutions, respectively, around the earth every 8 days. The GLONASS system uses two carrier signals L1 and L2 with frequencies of f1=(1.602+9 k/16) GHz and f2=(1.246+7 k/16) GHz, where k (=0,1,2, . . . 23) is the channel or satellite number. These frequencies lie in two bands at 1.597–1.617 GHz (L1) and 1,240–1,260 GHz (L2). The L1 code is modeled by a C/A-code (chip rate=0.511 MHz) and by a P(Y)-code (chip rate=5.11 MHz). The L2 code is presently modeled only by the P(Y)-code. The GLONASS satellites also transmit navigational data at a rate of 50 Baud. Because the channel frequencies are distinguishable from each other, the P(Y)-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System (GPS), to a Global Orbiting Navigation Satellite System (GLONASS), and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

In one embodiment, the GPS receiver 40 including an antenna 18 is installed in a mobile unit 12. The GPS receiver can be implemented using a model SveeSix, 6-channel receiver module manufactured by Trimble Navigation. The GPS antenna can be implemented using a magnetically mountable model 21423-00 commercially available from Trimble Navigation of Sunnyvale, Calif. and may be placed on the mobile unit 12 with the direct view of the sky as shown in FIG. 1.

As shown in FIG.2, the GPS receiver 40 includes a GPS receiving block 52, a memory 43, a user's computer (microprocessor) 54, an executable program 42, a display 44, a map-transmitting block 58, and a map-receiving block 46. The computer 54 can be implemented using a CPU such as a Motorola type 68000. The control display module 44 is a convenient man-machine interface between the user and the GPS receiver. The current position and speed of the GPS receiver can be automatically displayed on light-emitting diodes (LEDs), liquid crystal display (LCD), or cathode ray tube (video) screens. The control display unit can also display the exact time and waypoint navigation instructions under efficient user control, as discussed by Tom Logsdon, op cit, p. 49–52.

In one embodiment, the GPS receiver 40 (see FIG. 2) includes the memory 43 which is capable of electronically storing the map of the Large Geographic Area (LGA). This is the LGA embodiment. The example of the LGA map can be the map of the U.S.A., the map of the state of California, the map of the Contra-Costa County, etc. The memory capable of storing the LGA map can be implemented by using a CD-ROM system. In this embodiment the GPS receiver utilizes its own memory to process the satellite information and to output its position in the uni-dimensional coordinate system. In the LGA embodiment, the base station 22 (see FIG. 1) is not activated and no communication between the mobile unit 10 and the base station is involved.

In another embodiment, the memory 43 is capable of electronically storing only the map of a Small Geographic Area (SGA). The example of the SGA is the city of Walnut Creek. In the SGA embodiment, the user employs the mobile station 22 (FIG. 1) to store the map of the large geographic area (LGA), wherein the LGA map includes the initial ISGA map. The user also employs the mobile station for the purposes of selecting the arbitrary coordinate system in which the digital database of the LGA map can be provided, and for the purposes of transferring the digital database of the ISGA to the mobile unit 10 using the general interface 25. (See discussion in detail below.) The base station 22 is also used for the purposes of updating the digital map of the initial ISGA when the mobile unit is located outside of the ISGA, but is still located inside the LGA. As shown in FIG. 1, the base station 22 includes a base station computer 26, a memory 24, a display 30, an executable program 34 and a receiving-transmitting block 32. The computer 26 can be implemented by using a personal computer IBM-Pentium® running Microsoft Windows®-95 operating system.

In one embodiment, the general interface 25 includes a wireless link comprising the GPS map-transmitting block 58, the GPS map-receiving block 46, and the base station receiving-transmitting block 32.

In one embodiment, the wireless link 25 can include a cellular phone unit capable of transmitting the electronic map data. In another embodiment, the communication link 25 can employ a mobile switch telephone unit (MSTU) in order to transmit the electronic map data to the fixed supporting network. The communication link can also employ a public switch telephone network (PSTN) which carries the map data from the SATPS receiver to the base station and vice versa. See *Mobile Cellular Communications Systems*, by W. C. Y. Lee, New York, McGraw-Hill, 1989.

Yet, in another embodiment, the communication link 25 can be implemented by using a satellite communication link. Yet, in one more embodiment the communication link can be a radio channel.

In the preferred embodiment, the GPS receiver can determine the receiver's absolute position in a Latitude, Longitude, and Altitude (LLA) coordinate system related to a world geographic survey system 1984 (WGS84).

Thus, in the preferred embodiment, the GPS receiver outputs its position fixes in terms of LLA coordinates. However, relating that information to a road map has been difficult for lay people. Therefore, typically the user performs some kind of translation of his position location from the LLA coordinates into the particular road on the map. The present invention discloses the technique of automatically translating the GPS receiver position fix into a uni-dimensional coordinate system which corresponds to the particular road on the map.

FIG. 3 illustrates how the user can obtain the GPS position location and speed in the uni-dimensional coordinate system in the SGA embodiment. At first, the base station computer (26) selects an arbitrary coordinate system. In the selected arbitrary system the base station computer introduces the digital database of the large geographic area (LGA). The electronic map illustrating the digital database of the LGA (LGA database) is referred to by number 62 in FIG. 3. The LGA database introduces the coordinates of all points in the LGA in the arbitrary coordinate system including their connectivity.

In one embodiment, the connectivity of any pair of points can be defined as follows: the connectivity between two arbitrary points has the value of one if those two points can be connected and has the value of zero if they can not be connected.

The ABCD shows the small geographic area (SGA) 63 which is a subset of the LGA 62. The general interface 25 (see also FIG. 1) includes a physical layer and a protocol layer. The protocol layer of the general interface defines the protocol of the communication between the user's computer and the base station's computer. The protocol layer is also used to introduce the identity of the preferred coordinate system to the base station computer. The executable program 24 loaded into the base station computer 26 (see FIG. 1) translates points inside the LGA digital database from the arbitrary coordinate system into the preferred coordinate system. The physical layer of the general interface physically transfers the SGA subset of the digital database (the subset of the original LGA digital database that corresponds to the SGA) into the user's computer located in the mobile unit. The SGA digital database in the preferred coordinate system is referred to by number 66 in FIG. 3. The SGA database in the preferred coordinate system of the GPS receiver preserves the original connectivity between points of the original LGA digital database. The general interface can be implemented by using a cellular phone, a satellite link, a radio channel, etc.

The GPS receiver's position fix has a signal component and a noise component. To clarify the origin of the signal and noise components in the GPS receiver position fix, the following discussion is useful. When the mobile unit does not move, its velocity vector is dominated by noise, the speed is negligible, and the heading is uncertain. When the mobile unit starts to move, the velocity vector exceeds the noise, if the noise is kept at the same level. The level of noise of the position fix can be determined by the architecture of the GPS receiver and also by the indication in the GPS ephemeris that the selective availability (SA) is on. Speed is considered valid if the signal component of speed exceeds some predetermined value of the noise component of speed, wherein the estimate of speed is within the predetermined level of the true speed. If this is the case, the heading is certain within some specified threshold. For instance, if speed is greater than 10 miles/hour, the heading may have an acceptable accuracy. Therefore, the threshold for the non-zero heading is the value of speed greater than 10 m/h. With the increase of the speed, the heading error is rapidly decreased.

The "raw" fixes, including both the signal and noise components, outputted by the GPS receiver travelling along line AC within the SGA are referred to by number 68 in FIG. 3. To output the SATPS position in terms of a uni-dimensional coordinate system, at first the uni-dimensional coordinate system has to be defined. The line AC can be selected as a suitable uni-dimensional coordinate system because the signal component of the SATPS receiver's position is located on the line AC. The GPS receiver position fix can be expressed in terms of the distance $\alpha$ between the signal component of the position fix $(x_0 y_0 z_0)$ and the point A along the line AC and in terms of the distance $\beta$ between the signal component of the position fix $(x_0 y_0 z_0)$ and point C along the same line AC. Thus, the pair $(\alpha, \beta)$ is a uni-dimensional coordinate of the signal component of the position fix $(x_0 y_0 z_0)$ in the uni-dimensional coordinate system AC. The GPS receiver's speed, referred to by number 75, can also be depicted in the uni-dimensional coordinate system AC. The mobile unit can move towards point A or towards point C.

FIG. 4 depicts the formal translation procedure 80 of the digital database from the arbitrary coordinate system 82 into the preferred coordinate system of the PSDS 10 and illustrates the PSDS position location fix 136 and the PSDS speed fix 133 in the uni-dimensional coordinate system. The digital database in the arbitrary coordinate system 82 is represented in the form of table. The table has the number column 84, the x-coordinate column 86, the y-coordinate column 88, and the connectivity column 92. For instance, the point number "1" has the coordinates $(x_1\ y_1\ z_1)$ and can be connected with the points "2", "3", and "7". The base station computer's executable program 34 (see FIG. 1) translates the digital database from the arbitrary coordinate system (x, y, z) into the preferred system (x', y', z'), wherein all points preserve their connectivity properties. Thus, point "1" has the new preferred coordinates $(x'_1\ y'_1\ z'_1)$, but has the same connectivity numbers (2, 3, 7), that indicate that point "1" can be connected only with the same points (2, 3, 7) as in the arbitrary coordinate system (x, y, z).

The physical layer of the general interface 25 (see FIG. 1) transfers the digital database in the preferred coordinate system from the base station to the user's computer. The executable program 42 (see FIG. 2) loaded into the user's computer 54 selects the line (k, l) from all possible connectable pairs of the digital database in the preferred coordinate system (x', y', z') which includes the signal component of the GPS position fix. The signal component (x', y', z') of the mobile unit position fix 136 can be outputted in the uni-dimensional coordinate system (k, l) 130 in terms of the distance $\alpha$ (134) between the signal component of the position location $(x_0 y_0 z_0)$ and the point (k) 132 along line (k, l), and in terms of the distance $\beta$ (138) between the signal component of the position location $(x_0 y_0 z_0)$ and point (l) 140 along line (k, l). The pair $(\alpha, \beta)$ is a uni-dimensional coordinate of the signal component of the mobile unit position fix in the uni-dimensional coordinate system (k, l). The mobile unit speed 133 can be also outputted along the line (k, l), wherein the speed can be directed towards point (k) or towards point (l).

FIG. 5A illustrates the flow chart 160 of the process of outputting the GPS receiver's position location and speed in the uni-dimensional coordinates system in the SGA embodiment. At first (step 162 of FIG. 5), the user obtains the coordinate fix and the speed of the mobile unit in a preferred coordinate system using a position and speed determining system (PSDS). In the next step (164), the user's computer transforms the coordinate fix and speed of the mobile unit from the preferred coordinate system into a selected uni-dimensional coordinate system. Finally (step 166), the user's computer outputs the coordinate fix and the speed of the mobile unit in the uni-dimensional coordinate system.

In the Large Geographic Area (LGA) embodiment, the method of the present invention comprises the following steps (see flow chart 180 of FIG. 5B).

At first (step 182), a position and speed determining system (PSDS) obtains the coordinate fix and the speed of the mobile unit in a preferred coordinate system. Next (step 184), the user's computer retrieves from a base station computer the local map information corresponding to the position fix of the mobile unit. Then (step 186), the user's computer transforms the coordinate fix and speed of the mobile unit from the preferred coordinate system into the uni-dimensional coordinate system. Finally (step 188), the user's computer outputs the coordinate fix and the speed of the mobile unit in the uni-dimensional coordinate system.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A method of determining location and speed of a mobile unit along a path in a Small Geographic Area (SGA) in a uni-dimensional coordinate system, said method comprising the steps of:

obtaining the coordinate fix and the speed of said mobile unit in a preferred coordinate system using a position and speed determining system (PSDS);

transforming the coordinate fix and speed of said mobile unit from said preferred coordinate system into said uni-dimensional coordinate system using a user's computer;

retrieving a digital database of said SGA from a memory of said user's computer, wherein said SGA comprises a plurality (m) of points in an arbitrary coordinate system, m being an integer;

defining the original connectivity of said plurality of (m) points of said SGA in said arbitrary coordinate system, wherein the connectivity of each two points passable by said mobile unit is different from the connectivity of each two points not passable by said mobile unit;

translating points inside said digital database from said arbitrary coordinate system into said preferred coordinate system by an executable program loaded into said user's computer;

defining said uni-dimensional coordinate system in said preferred coordinate system by using said executable program of said user's computer; and outputting the coordinate fix and the speed of said mobile unit in said uni-dimensional coordinate system.

2. The method of claim 1, wherein said step of defining the original connectivity of said digital database further comprises the step of:

defining the connectivity in such a way that each two points have connectivity of value one if they are connectable, and each two points have connectivity of value zero if they are not connectable.

3. The method of claim 2, wherein the step of defining said uni-dimensional coordinate system in said preferred coordinate system further includes the steps of:

enumerating each said point of digital database of said SGA, wherein said enumerating process generates a plurality of numbers $(1, 2, \ldots, i, \ldots m)$, and wherein each said (i) point from said digital database has the three dimensional coordinate $(x_i\ y_i\ z_i)$ in said preferred coordinate system;

connecting each two points (k, l) from said digital database having connectivity of value one in said preferred coordinate system, k and l being integers; and generating at least one uni-dimensional coordinate system, wherein each line created by connecting two points having connectivity of value one in said preferred coordinate system comprises said uni-dimensional coordinate system.

4. The method of claim 3, wherein the step of outputting the position location coordinates and speed of said mobile unit in said uni-dimensional coordinate system further includes the steps of:

obtaining a signal component $(x_0 y_0 z_0)$ of the position fix of said mobile unit, wherein said position fix includes said signal component and a noise component;

outputting said signal component $(x_0 y_0 z_0)$ of said position location along some line (s, t), wherein said line (s, t) connects points (s) and (t) in said SGA digital database having connectivity of value one, and wherein said line (s, t) represents a unique uni-dimensional coordinate system which includes said digital component $(x_0 y_0 z_0)$ of said position fix determined by said PSDS; and determining the distance $\alpha$ between said signal component of the position fix $(x_0 y_0 z_0)$ and point (s) along said line (s,t), and determining the distance $\beta$ between said signal component of the position fix $(x_0 y_0 z_0)$ and point (t) along said line (s,t), wherein said pair $(\alpha, \beta)$ comprises a uni-dimensional coordinate of said signal component of the position fix of said mobile unit in said uni-dimensional coordinate system (s,t).

5. The method of claim 4 further including the steps of:

obtaining the speed of said mobile unit having said coordinate fix signal component $(x_0 y_0 z_0)$; and outputting said speed of said mobile unit corresponding to said position location $(x_0 y_0 z_0)$ along said line (s, t) in the direction towards the point (s) or in the direction towards point (t).

6. The method of claim 1, wherein said PSDS includes a satellite positioning system (SATPS) receiver, and wherein the step of obtaining the coordinate fix and the speed of said mobile unit in said preferred coordinate system further includes the steps of:

receiving the satellite signals from a satellite positioning system (SATPS) by said SATPS receiver; and processing information included in the satellite signals by said SATPS receiver.

7. The method of claim 1, said PSDS including an inertial position determining system (IPDS), said IPDS including a self-operating inertial sensor, wherein the step of obtaining the coordinate fix and the speed of said mobile unit in said preferred coordinate system includes the steps of:

producing positional and speed data by said self-operating inertial sensor; and processing said positional and speed data by said inertial IPDS.

8. The method of claim 1, said PSDS including a satellite positioning system (SATPS) receiver and an inertial position determining system (IPDS), said IPDS including a self-operating inertial sensor, wherein the step of obtaining the coordinate fix and the speed of said mobile unit in said preferred coordinate system further includes the steps of:

receiving the satellite signals from a satellite positioning system (SATPS) by said SATPS receiver;

producing positional and speed data by said self-operating inertial sensor;

processing information included in the satellite signals received by said SATPS receiver; and processing the information included in the positional data produced by said inertial sensor.

9. The method of claim 1 further including the step of:

selecting a preferred coordinate system in which said PSDS operates.

10. The method of claim 9, wherein the step of selecting said preferred coordinate system comprises the step of:

selecting a Latitude, Longitude, and Altitude (LLA) coordinate system with respect to the world geographic survey system 1984 (WGS84).

11. The method of claim 1, wherein said step of obtaining the speed of said mobile unit in a preferred coordinate system using a position and speed determining system (PSDS) further comprises the step of:

computing a three-dimensional velocity vector, a speed, said speed being a magnitude of said three-dimensional velocity, and a heading, said heading being a horizontal projection of said three-dimensional speed of said mobile unit.

12. The method of claim 10, wherein said step of obtaining the coordinate fix of said mobile unit in said preferred coordinate system using a position and speed determining system (PSDS) further comprises the step of:

computing LLA coordinates of said mobile unit, wherein LLA coordinates measurements are used for determining the signal and noise components of said position location of said mobile unit, and wherein said speed and heading measurements are used for determining said signal and said noise components of said position location of said mobile unit.

13. The method of claim 12, wherein said user computer further comprises a user computer display, said method further comprising the step of:

displaying the position fix and speed of said mobile unit in said uni-dimensional coordinate system using said user computer's electronic display.

14. A method of determining location and speed of a mobile unit along a path in a Large Geographic Area (LGA) in a uni-dimensional coordinate system, said method comprising the steps of:

obtaining the coordinate fix and the speed of said mobile unit in a preferred coordinate system using a position and speed determining system (PSDS);

retrieving a digital database of said LGA from a base station computer, wherein said LGA comprises a plurality (m) of points in an arbitrary coordinate system, m being an integer; wherein said LGA digital database includes the local map information corresponding to the position fix of said mobile unit;

defining the original connectivity of said plurality of (m) points of said LGA in said arbitrary coordinate system, wherein the connectivity of each two points passable by said mobile unit is different from the connectivity of each two points not passable by said mobile unit;

translating points inside said digital database from said arbitrary coordinate system into said preferred coordinate system by an executable program loaded into said user's computer;

defining said uni-dimensional coordinate system in said preferred coordinate system by using said executable program of said user's computer;

transforming the coordinate fix and speed of said mobile unit from said preferred coordinate system into said uni-dimensional coordinate system using a user's computer; and outputting the coordinate fix and the speed of said mobile unit in said uni-dimensional coordinate system.

15. The method of claim 14, wherein the step of retrieving from said base station computer storing the LGA map information the local map information corresponding to the position fix of said mobile unit further includes the step of:

physically transferring said local map information from said base station computer to said user computer by using a physical layer of a general interface.

16. The method of claim 15, wherein the step of physically transferring said local map information from said base station computer to said user computer by using a physical layer of a general interface further includes the step of:

using a conventional telephone as a physical layer.

17. The method of claim 15, wherein the step of physically transferring said local map information from said base station computer to said user computer by using physical layer of a general interface further includes the step of:

using a wireless communication system as a physical layer.

18. The method of claim 15, wherein the step of physically transferring said local map information from said base station computer to said user computer by using a physical layer of a general interface further includes the step of:

using a satellite communication system as a physical layer.

* * * * *